UNITED STATES PATENT OFFICE.

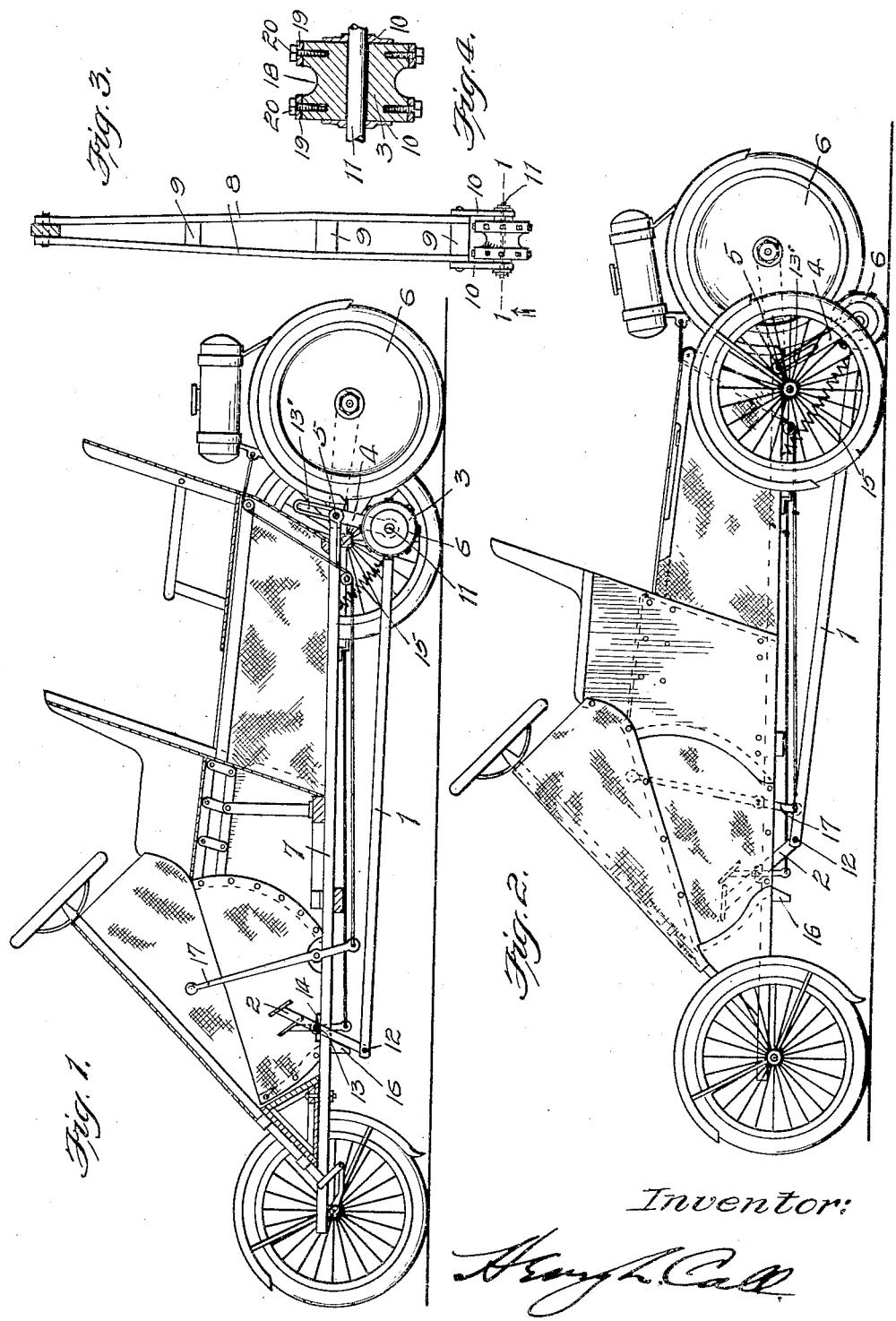

HENRY L. CALL, OF ST. LOUIS, MISSOURI.

VEHICLE.

1,337,437.　　　　Specification of Letters Patent.　　Patented Apr. 20, 1920.

Application filed December 23, 1918. Serial No. 268,019.

*To all whom it may concern:*

Be it known that I, HENRY L. CALL, a citizen of the United States, residing at St. Louis, in the county of St. Louis and State of Missouri, have invented a certain new and useful Improvement in Vehicles, of which the following is a specification.

My invention relates to improvements in motor propelled vehicles of a buck-board type, having particular reference to such of said type of vehicles as are propelled by motor-wheels outside thereof; and the object of my improvement is to provide a motor wheel driven vehicle the direction of motion of which can be instantaneously reversed.

I attain this object by the mechanism illustrated in the accompanying drawings, in which:—

Figure 1, is a longitudinal section of said vehicle showing the said reversing mechanism at rest or when not in operation.

Fig. 2, is a side elevation of said vehicle, showing the said reversing mechanism in operation.

Fig. 3, is a plan view of said reversing mechanism.

Fig. 4, is a cross section on line 1—1 of Fig. 3.

Similar figures refer to similar parts throughout the several views.

The said reversing mechanism consists of the longitudinally extending bar 1, the foot lever 2, the reversing wheel 3, and the metal strips 4 supporting said wheel 3 upon the pin 5, by which the motor wheel 6 is attached to and pivoted upon the floor 7 of said vehicle.

To understand the operation of this mechanism, it must be explained and understood that the motor wheel 6, which forms the driving and propelling means for car, is attached pivotally thereto, and to the framework thereof, by means of the pin 5 transverse to the length and movements of said car, which said pin 5 and means and method of attachments, permits said motor wheel 6 a free movement up and down for the purpose of maintaining at all times a driving engagement with the roadbed under all conditions of unevenness thereof, and for the purpose also of lifting said motor wheel 6 clear of the roadbed when it is desired to stop the car, or for any reason to detach the driving power thereof from roadbed, without stopping the engine.

The bar 1 consists of the two parallel members 8, preferably of wood, connected or joined by the blocks 9 also preferably of wood and the metal strips 10 secured thereto by suitable means. Said metal strips 10 at their rear ends are supplied with holes to accommodate the metal pin 11, which said pin forms the axle by means of which said reversing wheel 3 is revolubly supported between said metal strips 10. The foot lever 2 is pivotally attached to the forward end of bar 1 by means of a metal pin 12 which passes through the forward end of said bar 1. Said foot lever 2 is pivotally attached to car floor 7 by means of metal pin 13 secured at either end to car floor 7 by metal blocks 14. Said reversing wheel 3 is supported upon said car and the floor 7 thereof by metal strips 4, which said strips are provided at their lower ends with holes to accommodate metal pin 11 which forms the axle of said reversing wheel and also attaches said wheel to bar 1 by means of the holes provided in rear of metal strips 10, as aforesaid. Said metal strips 4 are supplied at their upper ends with slots 13', to provide a sliding and pivotal support and attachment upon and to pin 5.

When in stationary and inoperative position the reversing wheel 3 is supported clear of motor wheel 6 and adjacent to floor 7 of car, but also clear of said car floor 7, being held in this position by tension spring 15 attached at its upper end to car floor 7 and at its lower end to said bar 1, at a point just forward of said reversing wheel 3, and also by block or stop 16 secured to the underside of car floor 7 just forward of foot lever 2, which block or stop 16 prevents the forward movements of bar 1 and reversing wheel 3 by tension spring 15 beyond a fixed point where said wheel 3 rides just clear of motor wheel 6. The slots provided in the upper portions of metal strips 4 are so located that when reversing mechanism is in stationary or inoperative position, pin 5 rests against the extreme lower ends of said slots, and thus prevents the upward movement of reversing wheel 3 by the tension of spring 15 beyond a fixed point where said wheel 3 remains clear of car floor 7.

When it is desired to reverse the forward direction of movement of said car by means of said reversing mechanism, the operator or passenger engages his foot with the upper portion of foot lever 2 and presses forward upon same, thus overcoming the tension of tension spring 15, and forcing reversing wheel 3 backward into contact or engagement with motor wheel 6; it being, of course, presumed and predicated that the said operator has first lifted said motor wheel 6 clear of the roadbed by means of hand lever 17 provided for such purpose, in order to stop the forward propulsion of car by said motor wheel 6. Further exertion of such foot pressure, combined with the engagement and action of said motor wheel 6 with and upon said reversing wheel 3, serves to force said reversing wheel downward and backward until it comes in contact and engagement with roadbed, and sufficiently far under said motor wheel 6 so that practically the entire weight of the latter and its consequent full driving power, is exerted against and upon said reversing wheel 3, turning it, of course, in a reverse direction to that of the motor-wheel 6, and thus propelling said car in a reverse or backward direction from which it was propelled by motor wheel 6, when latter was itself in direct contact and engagement with roadbed.

The slots provided in the upper portions of metal strips 4 are for the purpose of permitting the downward and backward movement of said reversing wheel 3 under foot pressure of operator, and are so regulated and of sufficient length to prevent the engagement of upper ends or portions thereof with the supporting pin 5 until said reversing wheel 3 is sufficiently far under motor wheel 6 to permit of its continuous engagement with same under all conditions of unevenness of roadbed, and at the same time to permit said pin 5 to engage the upper ends of said slots when the foregoing result is attained in order to prevent said reversing wheel 3 from moving too far under motor wheel 6 and causing the latter to jump and thus become disengaged or only intermittently engaged.

The reversing wheel 3 is preferably of wooden construction with a peripheral groove 18 in the center thereof to receive the tire of motor wheel 6 and is provided with flat tires 19, preferably of leather or rubber construction, on its peripheral faces on each side of groove 19 to engage along their inner edges the rubber tire of motor wheel 6, said flat tires 19 being secured to wheel 3 by heavy headed iron or steel screws 20 preferably of the type known as "lag-screws," for engagement with roadbed.

It will be readily seen that the said reversing mechanism provides a motor wheel driven vehicle the forward movement of which can be instantaneously reversed, thus answering the use of and performing the operation of, the reversing gears provided for such purpose in the ordinary type of motor vehicles, in which the motor is contained in the vehicle itself and overcoming the serious difficulty heretofore existing against vehicles of the motor wheel driven type as practical road vehicles in that they were capable of forward movement only.

I am aware that prior to my invention motor driven vehicles have been made, propelled in a forward direction by motor wheels outside thereof and attached thereto by horizontal pivots arranged transversely of said vehicles, which enabled said motor wheels to accommodate themselves to the unevenness of roadbed and thus maintain a continuous driving or propelling engagement with the roadbed. I therefore, do not, claim such a combination broadly, but—

What I claim is:

1. In a motor wheel propelled vehicle, a reversing mechanism consisting of revoluble means adapted to engage said propelling motor wheel when latter is lifted clear of roadbed, and propel vehicle in a reverse or backward direction.

2. In a motor vehicle of the type propelled by a motor wheel outside thereof and pivotally attached thereto, a reversing mechanism consisting of a reversing wheel attached to and suspended from said vehicle in such manner that said reversing wheel can be made to engage motor wheel when same is lifted clear of roadbed, and thereby propel vehicle in a reverse or backward direction from which same is propelled by motor wheel when latter is in engagement with roadbed.

3. In a motor wheel propelled vehicle, a reversing mechanism consisting of a reversing wheel with means of support and attachment substantially as shown and described whereby said reversing wheel can be brought into engagement with said motor wheel when same is lifted clear of roadbed, and at the same time in engagement with the roadbed itself, and thereby propel vehicle in a reverse and opposite direction from which same is propelled by motor wheel when latter is in direct engagement with roadbed.

4. In a motor propelled vehicle of the type propelled by motor wheel outside the body thereof and pivotally attached thereto in such manner that motor wheel can be lifted clear of roadbed with engine power still applied, a reversing mechanism consisting of a separate reversing wheel supported upon and suspended from vehicle, in such manner as to permit of said reversing wheel being brought into simultaneous engagement both with motor wheel when same is lifted clear of roadbed and with the roadbed itself so that the engine power applied to motor wheel may revolve said reversing wheel in a reverse and opposite direction to that of the motor wheel itself and thus and thereby propel vehicle in a reverse and opposite direction from which it is and was propelled by motor wheel when itself is in direct engagement with roadbed, substantially as shown and described.

5. In a motor vehicle of the type propelled by a motor wheel outside the body thereof and pivotally attached thereto in such manner that motor wheel can be lifted clear of roadbed with engine power still applied and in operation, a reversing mechanism consisting of a separate reversing wheel and means of supporting and suspending same from vehicle as also means of operating said reversing wheel from vehicle, whereby said reversing wheel is adapted to, and can be brought into engagement with motor wheel when latter is lifted clear of roadbed as also into engagement with roadbed, so that the engine power of motor wheel is applied to reversing wheel and revolves it in an opposite or reverse direction to that of motor wheel itself, and thus and thereby propel said vehicle in a reverse and opposite direction from which it is propelled by said motor when itself is in direct engagement with roadbed, substantially as shown and described.

In testimony whereof, I have hereunto signed my name to the specification.

HENRY L. CALL.